(12) United States Patent
Conrad et al.

(10) Patent No.: US 6,731,844 B2
(45) Date of Patent: May 4, 2004

(54) IDENTIFICATION OF OPTICAL RIBBONS

(75) Inventors: Craig M. Conrad, Hickory, NC (US); David W. Chiasson, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 09/886,559

(22) Filed: Jun. 21, 2001

(65) Prior Publication Data

US 2002/0197032 A1 Dec. 26, 2002

(51) Int. Cl.[7] ................................................. G02B 6/44
(52) U.S. Cl. ......................................... 385/114; 439/488
(58) Field of Search ........................... 385/114; 439/488

(56) References Cited

U.S. PATENT DOCUMENTS

| | | | |
|---|---|---|---|
| 4,761,129 A | | 8/1988 | Aste et al. ............... 425/133.1 |
| 4,822,134 A | | 4/1989 | Campbell ................ 350/96.23 |
| 4,848,868 A | | 7/1989 | Rohner .................... 350/96.23 |
| 4,900,126 A | * | 2/1990 | Jackson et al. ............. 385/114 |
| 5,082,347 A | | 1/1992 | Akasaka et al. ............ 385/114 |
| 5,377,292 A | * | 12/1994 | Bartling et al. ............. 385/128 |
| 5,379,363 A | * | 1/1995 | Bonicel et al. ............. 385/114 |
| 5,463,838 A | | 11/1995 | Collier ....................... 52/741.1 |
| 5,485,539 A | | 1/1996 | Mills ........................... 385/114 |
| 5,645,899 A | * | 7/1997 | Unterberger ................ 427/558 |
| 5,796,905 A | * | 8/1998 | Hoffart et al. .............. 385/128 |
| 5,809,195 A | | 9/1998 | Brown et al. ............... 385/114 |
| 5,956,446 A | * | 9/1999 | Benzel ........................ 385/114 |
| 5,970,196 A | | 10/1999 | Greveling et al. .......... 385/114 |
| 6,028,976 A | * | 2/2000 | Sato et al. ................... 385/114 |
| 6,064,789 A | | 5/2000 | Mills ........................... 385/114 |
| 6,381,390 B1 | * | 4/2002 | Hutton et al. ............... 385/114 |
| 6,470,121 B2 | * | 10/2002 | Mills et al. .................. 385/114 |
| 6,483,972 B1 | * | 11/2002 | Thompson et al. ......... 385/114 |
| 6,498,883 B1 | * | 12/2002 | Wilson ........................ 385/114 |
| 6,512,869 B1 | * | 1/2003 | Imayama et al. ........... 385/114 |
| 6,532,329 B1 | * | 3/2003 | Thompson ................... 385/114 |
| 6,535,673 B1 | * | 3/2003 | Lochkovic ................... 385/114 |
| 2001/0048797 A1 | * | 12/2001 | Van Dijk et al. ........... 385/114 |

FOREIGN PATENT DOCUMENTS

| | | | | |
|---|---|---|---|---|
| JP | 01138517 A | * | 5/1989 | ............ G02B/6/44 |
| JP | 01138518 A | * | 5/1989 | ............ G02B/6/44 |
| JP | 01200311 A | * | 8/1989 | ............ G02B/6/44 |
| JP | 01251005 A | * | 10/1989 | ............ G02B/6/44 |
| JP | 02282709 A | * | 11/1990 | ............ G02B/6/44 |

OTHER PUBLICATIONS

Mims, Forrest M., III, "Getting Started in Electronics," Radio Shack, A Division of Tandy Corporation, p. 29, 1983.*

* cited by examiner

Primary Examiner—Hae Moon Hyeon
(74) Attorney, Agent, or Firm—Timothy J. Aberle

(57) ABSTRACT

In a fiber optic cable having a plurality of optical ribbons, identifying information about each optical ribbon is conveyed by a series of colored regions of different colors visible on an outer surface of the optical ribbon matrix covering. In preferred embodiments of the present invention, the colored regions are formed in such a way that they do not cause microbending or the like. Preferably, the colored regions are formed during the process of extruding the matrix covering over the fibers, by injecting colored material into the extrusion die.

36 Claims, 4 Drawing Sheets

| COLOR | 1ST DIGIT | 2ND DIGIT | FIBER TYPE |
|---|---|---|---|
| BLACK | 0 | 0 | |
| BROWN | 1 | 1 | |
| RED | 2 | 2 | |
| ORANGE | 3 | 3 | |
| YELLOW | 4 | 4 | |
| GREEN | 5 | 5 | |
| BLUE | 6 | 6 | |
| VIOLET | 7 | 7 | |
| SLATE | 8 | 8 | |
| WHITE | 9 | 9 | |
| ROSE | – | – | LEAF |
| AQUA | – | – | SMF |
| NO COLOR | – | – | MMF |

IDENTIFICATION OF OPTICAL RIBBONS

FIELD OF THE INVENTION

The present invention relates generally to optical fiber ribbons and to fiber optic cables incorporating at least one such optical ribbon. The present invention relates more particularly to a system for optical ribbon identification.

BACKGROUND OF THE INVENTION

In fiber optic cables that contain a relatively large number of optical fibers, the fibers are often provided in the form of optical ribbons. For instance, one type of cable in common use comprises a single buffer tube containing one or more stacks of optical ribbons. Each stack of optical ribbons can contain as many as 18 optical ribbons, or even more. In use, a given optical ribbon is separated from the stack and some or all of the individual fibers in the optical ribbon are connected to further devices of the overall system architecture. Accordingly, it is necessary for a worker in the field to be able to pick out a given optical ribbon in a stack.

To this end, techniques have been developed for optical ribbon identification by applying visible markings to the optical ribbons. For instance, one such technique currently in use is to apply indicia to the matrix covering of an optical ribbon, in the form of dots of ink that collectively form characters (i.e., letters and numbers). It has become a standard practice to identify optical ribbons by two pieces of information: ribbon number, and fiber type. More specifically, if a cable contains, for example, 18 optical ribbons, the optical ribbons are assigned numbers from one to 18. Some optical ribbons may contain single-mode fibers while other optical ribbons may contain multi-mode fibers or other types of fibers. Thus, in accordance with the conventional method for identifying the optical ribbons, each optical ribbon is marked with its ribbon number (e.g., "07" to denote the seventh optical ribbon) and with one or more additional characters denoting the type of fibers contained in the optical ribbon (e.g., "S" to denote single-mode fibers).

One known disadvantage of marking optical ribbons with characters formed by ink dots, as described for instance in U.S. Pat. No. 6,064,789 assigned to the assignee of the present application and incorporated herein by reference, is that the ink dots can produce microbending in the fibers, which can result in an increase in optical attenuation. It would be desirable to reduce or eliminate such increase in optical attenuation caused by application of optical ribbon identifiers. The '789 patent discloses a technique for applying ink dots in such a way that a lesser increase in optical attenuation is caused thereby. The technique is effective, but still further improvement would be desirable.

In addition to the need to identify and break out individual optical ribbons from a cable, there is sometimes a need to identify and/or break out one or more particular optical fiber sub-units from a given optical ribbon whose optical fibers are arranged into two or more fiber sub-units. For instance, a 36-fiber optical ribbon may have the optical fibers arranged in three sub-units of 12 fibers each. Each sub-unit has a matrix covering that binds the optical fibers together, and another outer matrix covering binds the sub-units together. It is desirable with such an optical ribbon to be able to separate any one of the sub-units from the others, and to have the optical fibers of the separated sub-unit remain bonded together. With existing optical ribbons, it is sometimes difficult to accomplish this task.

Additionally, when separating a fiber sub-unit from an optical ribbon, it would be desirable for the separated sub-unit to retain identifying indicia or other markings enabling the worker to identify the sub-unit. Existing optical ribbons typically have such identifying indicia printed on the outer surface of the outer matrix covering. When separating one such optical ribbon from another in the field, it sometimes happens that the two optical ribbons do not cleanly separate at the juncture between their outer matrix coverings, but instead part of the outer covering of one ribbon remains bonded to the outer covering of the other ribbon. Because of this phenomenon, sometimes referred to as "overhang", the identifying indicia of the one ribbon can be inadvertently stripped off when the optical ribbons are peeled apart from each other, making it more difficult to properly identify the sub-units of the affected ribbon. It would be desirable to provide an optical ribbon facilitating a more-reliable identification of optical ribbon sub-units.

SUMMARY OF THE INVENTION(S)

In accordance with one aspect of the present inventions, identifying information about an optical ribbon is conveyed by a series of colored regions visible at an outer surface of the optical ribbon matrix covering. In preferred embodiments of the present invention, the colored regions are formed in such a way that they do not cause microbending or the like.

More particularly, an optical ribbon in accordance with one preferred embodiment of the present invention is identified by providing at least two colored regions visible at the outer surface of the matrix covering of the optical ribbon. At least one colored region is used to distinguish the optical ribbon from other optical ribbons in a given cable. For example, one or more colored regions can be used to denote a number pre-assigned to the optical ribbon; thus, if the optical ribbons in a cable are assigned two-digit identifying numbers, each optical ribbon can have two colored regions denoting the two digits of the optical ribbon number. Of course, if three-digit numbers were used for identifying the optical ribbons, then three colored regions could be used for denoting the three digits. Each colored region preferably has a color that denotes an integer number, in accordance with a predetermined code. For instance, the color black can denote the integer "0", and brown can denote the integer "1". Additional integers can be denoted by other colors.

The type of optical fibers contained in an optical ribbon can be denoted by another of the colored regions. As an example, such colored region can be the color gold to denote multi-mode fibers, or the color silver to denote single-mode fibers. Yet another color can be used to denote another fiber type, such as large effective area fibers, for example LEAF® optical fibers of Corning Inc.; alternatively, the absence of any color in the colored region for fiber type could be used to denote such additional fiber type.

In preferred embodiments of the present invention, the colored regions comprise stripes formed on or in the matrix covering of the optical ribbon. Advantageously, the stripes extend continuously along the length of the optical ribbon. Alternatively, the stripes can extend transversely across the optical ribbon and can be repeated at periodic intervals therealong. Furthermore, colored regions in shapes other than stripes can be used.

An optical ribbon in accordance with one preferred embodiment of the present invention is provided with identifying colored regions during the process of forming the optical ribbon. The optical fibers are passed through an extrusion tool into which fluid matrix material, typically a UV-curable polymer, is supplied such that a covering of the matrix material is extruded over the fibers. Colored polymer material is also supplied to the extrusion tool through passages formed therein. The colored material can be matrix material to which coloring agents are added, or can be ink or the like. Preferably, the passages are so formed and located that the colored material is injected at a point upstream of the exit portion of the extrusion tool defining the outer profile of the matrix covering. In this way, the colored regions do not form protrusions that could cause microbending in the optical fibers.

As an alternative, the colored material can be applied after extrusion of the matrix covering but before the matrix material is cured, such as in an additional tool. Furthermore, other methods for applying the colored regions could be used, all in accordance with the present invention.

In another aspect of the present invention, separation and/or identification of fiber sub-units in an optical ribbon are facilitated. An optical ribbon in accordance with a preferred embodiment of the invention comprises a plurality of optical fibers arranged generally parallel to one another in a generally planar array, the optical fibers being arranged into at least two fiber sub-units; and an outer matrix covering that encapsulates and binds together the fiber sub-units, the outer matrix covering comprising separate regions of a first matrix material adhered respectively to each of the fiber sub-units and a connecting region of a second matrix material joining adjacent fiber sub-units together. The first matrix material adheres to the fiber sub-units with a greater tenacity than does the second matrix material such that the outer matrix covering preferentially splits at the connecting region between fiber sub-units, whereby the separate regions of the first matrix material tend to remain adhered to the fiber sub-units upon separation thereof. In this way, identifying indicia or markings printed on or otherwise provided on or in the separate regions of first matrix material tend to remain with the respective fiber sub-units. Preferably, the first matrix material has a higher modulus of elasticity than the second matrix material.

Yet another aspect of the present invention facilitates the identification of individual optical fibers within an optical ribbon. To this end, an optical ribbon in accordance with a preferred embodiment of the invention comprises a plurality of optical fibers arranged generally parallel to one another in a generally planar array, and a matrix covering that encapsulates and binds together the optical fibers, the matrix covering comprising a plurality of different colored regions formed of a first matrix material and bound respectively to the plurality of optical fibers for identifying the optical fibers. The matrix covering further comprises a second matrix material that intercedes between and maintains the colored regions substantially separate from one another. The first matrix material adheres to the optical fibers with a greater tenacity than the second matrix material, whereby the colored regions tend to remain adhered to the optical fibers. Preferably, the colored regions extend to and form part of an outer surface of the matrix covering. The optical ribbon can be manufactured by substantially simultaneously extruding the first and second matrix materials over the fibers. Thus, non-colored optical fibers can be colored and ribbonized in one step.

BRIEF DESCRIPTION OF THE DRAWINGS

The above and other objects, features, and advantages of the present invention will become more apparent from the following description of certain preferred embodiments thereof, when taken in conjunction with the accompanying drawings in which:

FIG. 2A is a fragmentary cross-sectional view through the optical ribbon of FIG. 2;

FIG. 2B is a view similar to FIG. 2A, showing an alternative embodiment in accordance with the present invention;

FIG. 2C is a cross-sectional view through an optical ribbon having three fiber sub-units, in accordance with a further embodiment of the invention;

FIG. 2D is a view similar to FIG. 2C, showing another alternative embodiment of the invention;

FIG. 6 is a cross-sectional view through an optical ribbon in accordance with a further embodiment of the invention; and FIG. 7 is a cross-sectional view through an optical ribbon in accordance with another embodiment of the invention.

DETAILED DESCRIPTION OF THE INVENTION

The present invention now will be described more fully hereinafter with reference to the accompanying drawings, in which preferred embodiments of the present invention are shown. The present invention may, however, be embodied in many different forms and should not be construed as limited to the embodiments set forth herein. Like numbers refer to like elements throughout.

Figure 1:
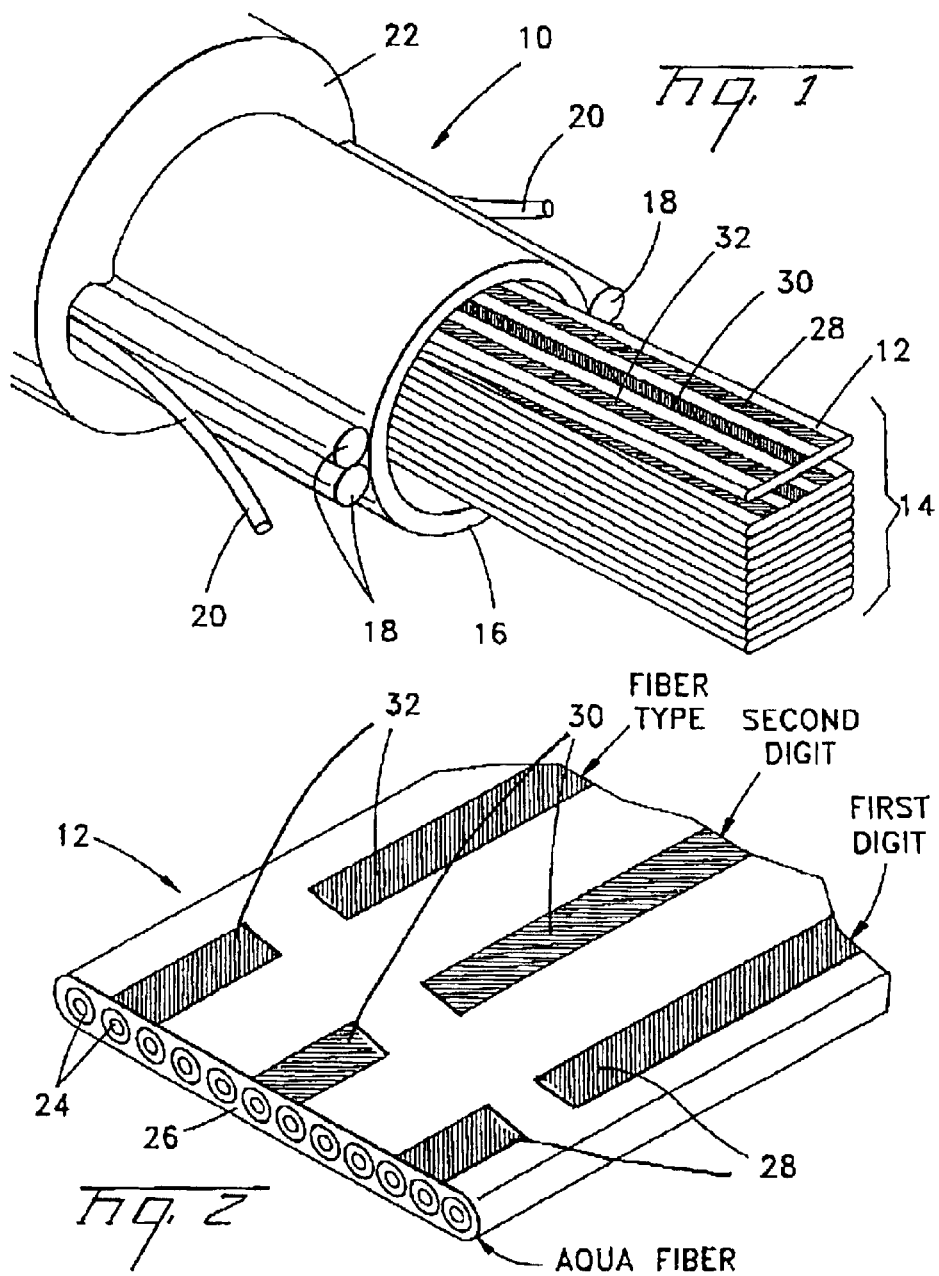
FIG. 1 is a perspective view of an exemplary fiber optic cable in accordance with one embodiment of the present invention.

As a non-limiting example of one type of cable to which the present invention can be applied, FIG. 1 shows a single-tube fiber optic cable 10 in accordance with one embodiment of the present invention. Cable 10 comprises a plurality of optical ribbons 12 arranged one upon another to form a stack 14. Optical ribbon stack 14 is disposed within the interior passage of a buffer tube 16. Cable 10 can include additional elements, such as strength members 18 and ripcords 20. Preferably, an outer jacket 22 surrounds buffer tube 16 and the other elements. The cable can have further elements such as water-blocking elements, water-swellable yarns or tapes, etc., if desired or needed in a particular application.

Figure 2:
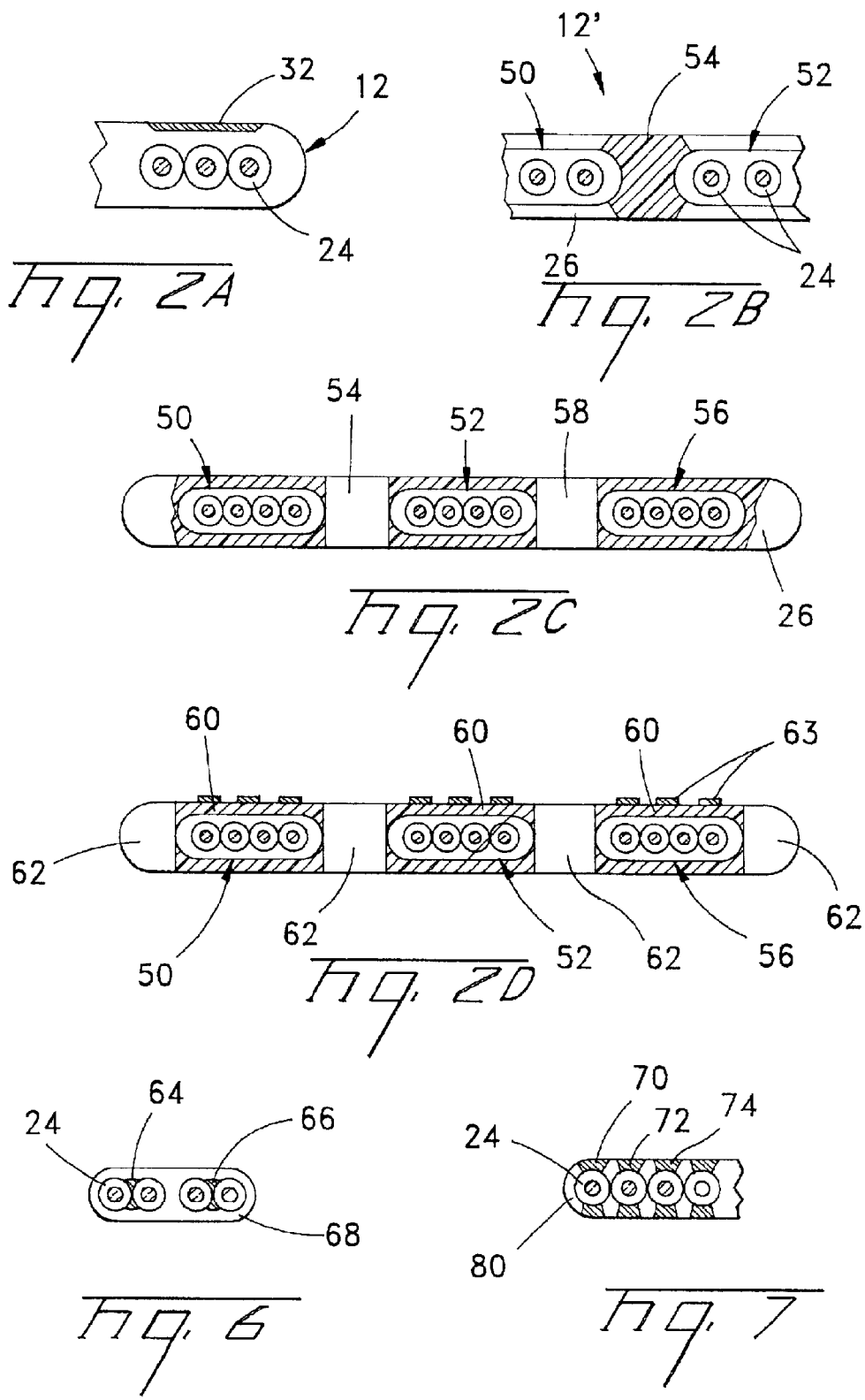
FIG. 2 is an isometric view of an optical ribbon in accordance with one embodiment of the present invention.

As shown in FIG. 2, each optical ribbon 12 includes a plurality of generally parallel optical fibers 24 arranged side-by-side in a generally planar array. An optical fiber 24 generally includes a silica-based core that is operative to transmit light and is surrounded by a silica-based cladding having a lower index of refraction than the core. A soft primary coating surrounds the cladding, and a relatively rigid secondary coating surrounds the primary coating. Optical fibers 24 can be, for example, single-mode, multi-mode, or large effective area optical fibers made commercially available by Corning Incorporated. Typically, each fiber 24 also includes an outer covering of plastic material that is colored for identification purposes. For instance, each fiber 24 in a given optical ribbon 12 can have a differently colored outer covering so that a particular fiber in the optical ribbon can be readily distinguished from the other fibers in the same optical ribbon. As an example, where optical ribbon 12 contains twelve fibers, the fiber outer coverings can be of twelve different colors, such as: black, brown, red, orange, yellow, green, blue, violet, slate, white, rose, and aqua.

The fibers 24 are bound together and covered by a covering 26 of matrix material, such as a UV-curable polymer, which is extruded over the fibers. Once cured, covering 26 adheres to fibers 24, but does not adhere so tenaciously that it cannot be removed from the fibers. A release agent can be applied between the fibers and covering 26, if desired, to facilitate removal of the covering. By stripping off an end portion of covering 26, optical fibers 24 are exposed so that they can be spliced or connected to further devices.

To enable a particular optical ribbon 12 in optical ribbon stack 14 to be distinguished from the other optical ribbons, each optical ribbon has colored regions 28, 30, 32 formed on or in matrix covering 26. In the illustrated embodiment in FIGS. 1 and 2, the colored regions comprise continuous stripes extending lengthwise along the optical ribbons. Each of colored regions 28, 30, 32 conveys a piece of information for identifying the optical ribbon to which it is applied.

In preferred embodiments of the present invention, each optical ribbon 12 in cable 10 is assigned a numerical identifier. For example, if the cable contains 18 optical ribbons, then the optical ribbons are assigned two-digit numbers from "01" to "18". Of course, any other group of 18 different two-digit numbers could be used if desired. To convey the information as to the numerical identifier for a given optical ribbon, the two colored regions 28 and 30 are applied to the optical ribbon. Colored region 28 denotes the first digit of the two-digit optical ribbon number. Colored region 30 denotes the second digit of the two-digit optical ribbon number. The colored regions 28, 30 preferably are applied to the optical ribbon 12 in a predetermined location with respect to the optical ribbon. For instance, as shown in FIG. 2, the first colored region 28 is located proximate the edge of the optical ribbon 12 having an aqua-colored fiber.

Figures 3, 4:
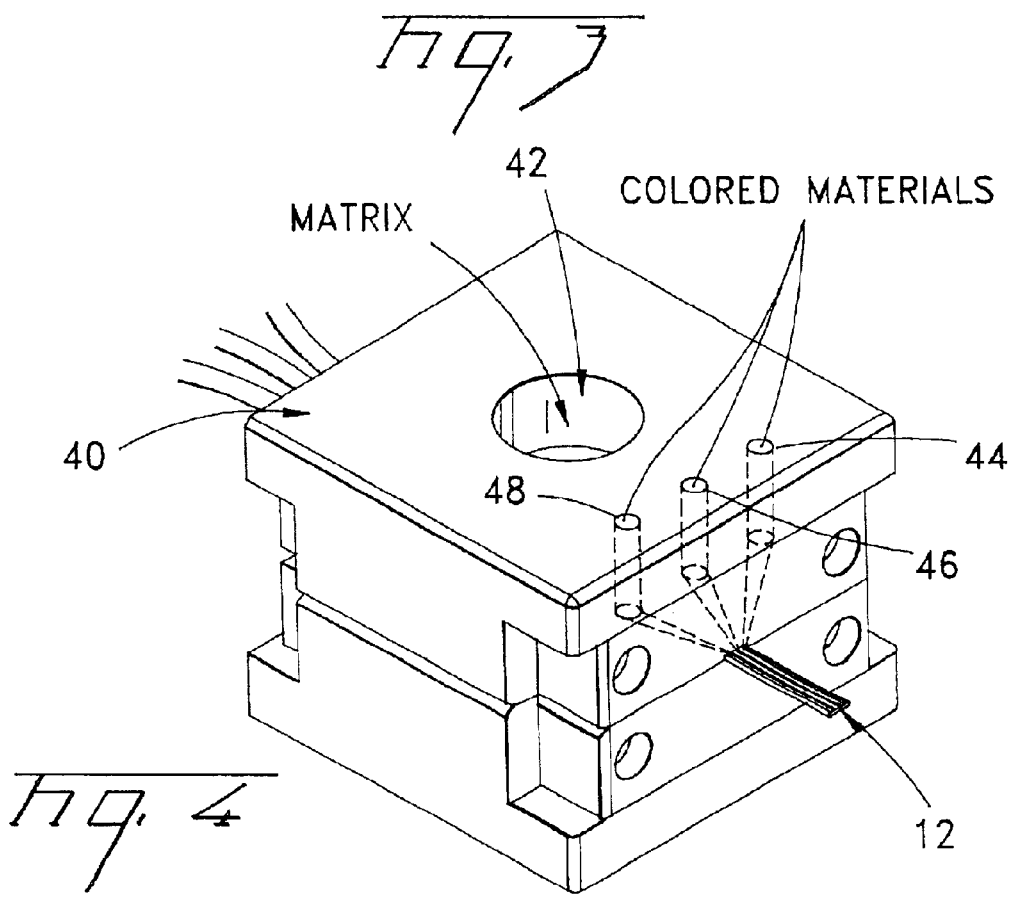
FIG. 3 is a table showing an exemplary color code for optical ribbons in accordance with a preferred embodiment of the present invention.
FIG. 4 is a perspective view of a tool for forming a color-coded optical ribbon in accordance with the present invention.

FIG. 3 is a table showing a color code that can be used in accordance with the present invention. As shown, there are ten different colors, arranged generally from darkest to lightest (black to white), for denoting each of the integers from "0" to "9". Thus, for instance, if an optical ribbon has an optical ribbon number of "07", then first colored region 28 is black to denote the first digit "0"; second colored region 30 is violet to denote the second digit "7". As another example, optical ribbon number "18" would have brown and slate colored regions 28, 30.

Each optical ribbon 12 preferably is also identified in terms of the type of optical fibers contained in the optical ribbon. At present, there are two general types of optical fibers in common use: single-mode fibers (SMF) and multi-mode fibers (MMF). Within each of these general categories, of course, variations are possible. For example, Corning Incorporated manufactures a particular high-bandwidth single-mode fiber marketed under the trademark LEAF®. The LEAF® fiber is a non-zero dispersion-shifted fiber (NZ-DSF). Although the LEAF® fiber can be generally classified as a single-mode fiber, it is desirable to distinguish optical ribbons having LEAF® fibers from optical ribbons having other types of single-mode fibers. Accordingly, it is desirable for the optical ribbon identification system of the present invention to accommodate at least two different fiber types (SMF and MMF), and more preferably at least three different fiber types (SMF, MMF, and LEAF®).

As shown in FIG. 3, this is accomplished by denoting the LEAF® fiber type with the color rose for colored region 32, denoting the SMF fiber type with the color aqua for colored region 32, and denoting the MMF fiber type with the absence of any color, i.e., colored region 32 is completely absent. Alternatively, a third color could be used for colored region 32 to denote MMF fibers. Of course, other colors could be used instead of those listed in FIG. 3. For example, two fiber types could be denoted by the colors gold and silver and a third fiber type could be denoted by the absence of either color.

Colored regions 28, 30, 32 of optical ribbon matrix 26 can be provided in various ways. Preferably, the colored regions should be provided in such a way as to generally preserve an overall thickness "t" (FIG. 2A) of the optical ribbon; i.e., the colored regions preferably do not form protrusions or bumps on the matrix covering that could cause microbending of the optical fibers. A preferred method for forming an optical ribbon with colored regions is now described with reference to FIG. 4, which depicts an optical ribbon-forming tool 40. Tool 40 is used for extruding matrix covering 26 over a plurality of optical fibers to form an optical ribbon. The fibers are advanced into one side of tool 40 such that the fibers are generally parallel to one another and arranged in a generally planar array. The fibers pass through an internal die slot (not shown) of tool 40. Connected with the die slot is a matrix feed passage 42 through which fluid matrix material is supplied, such that the matrix material is extruded over the fibers to form an optical ribbon 12; the optical ribbon is shown exiting the tool 40 in FIG. 4. After extrusion, the matrix covering is cured in suitable fashion, such as by irradiating it with UV light in the case of a UV-curable matrix material.

Also connected with the die slot of tool 40 are a plurality of feed channels 44, 46, 48 through which colored materials are fed for forming colored stripes in the optical ribbon matrix. Feed channels 44, 46, 48 preferably supply the colored materials into the die slot of the tool upstream of the exit portion of the die slot that sets the outer profile of the extruded matrix covering of the optical ribbon. In this way, colored stripes are formed integrally in the matrix covering so that the outer profile of the covering is not changed from its desired nominal profile, i.e., the stripes preferably are not bulging formations on top of the covering but are actually an integral part of the covering.

The colored materials fed into feed channels 44, 46, 48 can be of various types. Two examples of suitable colored materials are inks, and matrix material to which pigments or other coloring agents have been added. As noted, the matrix material typically comprises a UV-curable polymer. Various coloring agents or pigments can be added to the polymer material to impart various desired colors. Thus, matrix material of a suitable base color can be supplied through main feed passage 42 of tool 40, and matrix materials of the appropriate colors can be supplied through feed channels 44, 46, 48 so as to form stripes that are colored in accordance with the optical ribbon number and fiber type for the optical ribbon. The base color of the matrix preferably should have a sufficient contrast with each of the various colors that are used for the identifying stripes so that the stripes are readily discernable. For example, when the colors shown in FIG. 3 are used for optical ribbon identification, a gray color advantageously can be used for the base color of the matrix.

In the examples described thus far, optical ribbons 12 in cable 10 have been denoted by two-digit numbers. For most applications this would be sufficient, since current fiber optic cables in commercial use have far fewer than 100 optical ribbons per cable. However, if it were necessary for whatever reason to employ three-digit numbers for denoting the optical ribbons, three colored stripes could be used for denoting the optical ribbon numbers, and a fourth stripe could be used for indicating fiber type.

Another possible variation in accordance with the present invention is to apply the colored regions in shapes or patterns other than continuous stripes extending longitudinally along the optical ribbon. For instance, the colored regions could be discontinuous along the length of the optical ribbon, e.g., dashed or broken lines, or a series of discrete spaced regions. Alternatively, stripes 28', 30', 32' extending transversely across the optical ribbon can be used, as illustrated in the alternative embodiment of a fiber optic cable 10' shown in FIG. 5. The stripes 28', 30', 32' would be repeated at periodic intervals along the length of the optical ribbon (e.g., every 3–12 inches). Such transverse stripes can be applied to the optical ribbon by marking with ink, such as with an ink jet apparatus or the like.

It is also within the scope of the present invention to apply colored markings in discontinuous patterns spaced at intervals along an optical ribbon by other than an ink jet device. For instance, a process similar to that described in connection with FIG. 4 can be used, except that the supply of the colored materials through the feed channels 44, 46, 48 can be effected intermittently. Thus, the colored materials are supplied through the feed channels for a certain period of time and then the flow of the colored materials is stopped for another period of time, and this starting and stopping of the flow is performed at periodic intervals. The result is that the matrix covering of the optical ribbon has colored regions that are discontinuous in the length direction of the optical ribbon.

In accordance with another aspect of the present invention, one or more regions of the matrix covering can be formed of a material having a lower modulus than the material that forms the rest of the matrix covering such that the matrix covering preferentially splits or is readily cut or otherwise divided along a line or lines defined by the lower-modulus region(s). The lower-modulus region(s) can be located, for example, so as to facilitate splitting or dividing the matrix covering along a boundary line between two adjacent groups or sub-units of optical fibers of the optical ribbon. Thus, as illustrated in FIG. 2B, an optical ribbon 12' can have a first sub-unit 50 of adjacent optical fibers 24 and a second sub-unit 52 of adjacent optical fibers. A matrix covering 26 is extruded over the sub-units of optical fibers. Along a boundary line between the two sub-units of optical fibers, a region 54 is formed of lower modulus material than the rest of the matrix covering. Region 54 can extend only partially through the thickness of the optical ribbon as shown in FIG. 2B, or it can extend all the way through the thickness as shown in FIG. 2C. Region 54 can also serve an identification function as previously described, such as by coloring region 54 a predetermined color, or it can be used solely to facilitate dividing the matrix covering 26 to separate the sub-units of optical fibers. As shown in FIG. 2C, an optical ribbon can have more than two sub-units of optical fibers, in which case there can be more than one lower-modulus region; thus, in the illustrated embodiment of FIG. 2C, there is a third sub-unit 56 of optical fibers, and hence there are two lower-modulus regions 54 and 58 between the sub-units. The lower-modulus regions 54, 58 between optical fiber sub-units can be colored the same as the rest of the matrix covering of the optical ribbon if the regions are not being used for identification purposes and if there is no other reason for making the regions visually distinct from the rest of the matrix covering.

FIG. 2D depicts another embodiment of the present invention. In this embodiment, an optical ribbon is formed having two or more optical fiber sub-units 50, 52, 56. A matrix covering 26 is extruded over the optical fiber sub-units. During extrusion of the matrix covering 26, the sub-units pass through a space in an extrusion tool into which two different types of matrix material are injected. More particularly, a relatively high-adherence material 60 is injected so that the high-adherence material covers and directly contacts each optical fiber sub-unit. A second material 62 of lower adherence is injected so as to form the rest of the matrix covering. This can be accomplished, for example, by first injecting the lower-adherence material 62 so as to completely surround the optical fiber sub-units, and then injecting the high-adherence material 60 over each sub-unit so that the high-adherence material displaces the lower-adherence material. This causes the lower-adherence material to be displaced into regions between the sub-units, and the high-adherence material contacts and bonds to the fiber sub-units. The outer surface of the optical ribbon in the region of each fiber sub-unit is defined by the high-adherence material on the fiber sub-unit.

By "high-adherence material" is meant a material that tends to adhere to a fiber sub-unit with greater tenacity than does the lower-adherence material. Accordingly, when a fiber sub-unit of the optical ribbon is broken out from the ribbon, the high-adherence material tends to remain adhered to the fiber sub-unit. Stated differently, the matrix covering of the optical ribbon tends to preferentially split at the interstices between the fiber sub-units because the lower-adherence material between the fiber sub-units tends to detach from the fiber sub-units before the high-adherence does. In this manner, the high-adherence material tends to remain on each fiber sub-unit during separation of sub-units as well as when separating one optical ribbon from another in a ribbon stack. Accordingly, the high-adherence material provides a good foundation upon which indicia 63 can be printed for identification purposes, because the high-adherence material tends to remain on the fiber sub-units. It is also possible to incorporate regions of colored material into the high-adherence material for identification purposes in a manner similar to that previously described.

FIG. 6 depicts another embodiment of the invention that provides for grouping and identification of optical fibers within a ribbon or within a fiber sub-unit thereof. Thus, an optical fiber ribbon or sub-unit is shown having four optical fibers 24. The optical fibers are arranged into two pairs of adjacent optical fibers. A colored material 64 is applied to one pair of optical fibers and a colored material 66 is applied to the other pair of optical fibers prior to extruding an outer covering 68 over all of the optical fibers. Application of colored materials 64,66 can be accomplished by locating feed channels at the fiber entrance side of tool 40, rather than the fiber exit side of the tool as shown in FIG. 4. The colored materials 64, 66 can have colors selected to identify each pair of fibers. The colored materials preferably are relatively high-adherence materials compared to the material of outer covering 68, such that the colored materials tend to remain adhered to the optical fibers when the outer covering is stripped away. Preferably, outer covering 68 is sufficiently transparent so that colored materials 64, 66 are visible through the outer covering. Colored materials 64, 66 and outer covering 68 can be extruded in rapid succession, within the same extrusion tool if desired. Alternatively, pairs of optical fibers 24 can be bonded together by applying colored materials 64, 66 to the fiber pairs, and subsequently the bonded fiber pairs can be fed through an extrusion tool for extruding outer covering 68 over the fiber pairs.

In another aspect of the invention, individual optical fibers within an optical ribbon can be identified by color in a manner that simplifies manufacturing relative to conventional optical ribbon manufacturing methods. In conventional optical ribbon manufacture, each optical fiber is first coated with a colored matrix material of a different color from the other optical fibers that will be incorporated into the optical ribbon. The variously colored optical fibers are typically wound on spools. Then, in a separate manufacturing step, the fibers are drawn from the various spools and fed through an extrusion tool that extrudes an outer matrix covering over the fibers to form an optical ribbon.

In accordance with the present invention, coloring of the fibers and ribbonizing of the fibers can occur substantially simultaneously, preferably within the same extrusion tool. FIG. 7 depicts an optical ribbon made in this manner. The optical ribbon includes optical fibers 24 that are not previously coated with colored matrix material. Instead, the optical fibers are identified by colored regions 70, 72, 74, etc., i.e., a separate colored region for each optical fiber 24, and the colored regions form part of the ribbon matrix covering. More specifically, the matrix covering of the optical ribbon comprises colored regions 70, 72, 74, etc., formed of a first matrix material, and further comprises a second matrix material 80 that forms the rest of the outer covering of the ribbon. The second matrix material intercedes between the colored regions and maintains them separate from one another. Preferably, the first matrix material forming the colored regions adheres to the optical fibers with a greater tenacity than the second matrix material. Consequently, when the optical fibers are peeled apart from one another for routing the fibers to various devices in the field, the colored regions tend to remain adhered to the fibers rather than being peeled off with an adjoining part of the outer covering.

Preferably, colored regions 70, 72, 74, etc., extend to the outer surface of the ribbon's outer covering and form a part thereof. It is also preferred that the first matrix material forming the colored regions have a higher modulus of elasticity than the second matrix material forming the rest of the outer covering. As shown in FIG. 7, each colored region can be bound to less than all of the outer surface of the respective optical fiber; i.e., the colored region does not necessarily have to completely surround the optical fiber, but could be formed, for example, as a strip or stripe extending along only one side of the fiber, or as two strips or stripes extending along opposite sides of the fiber as in FIG. 7.

Figure 5:
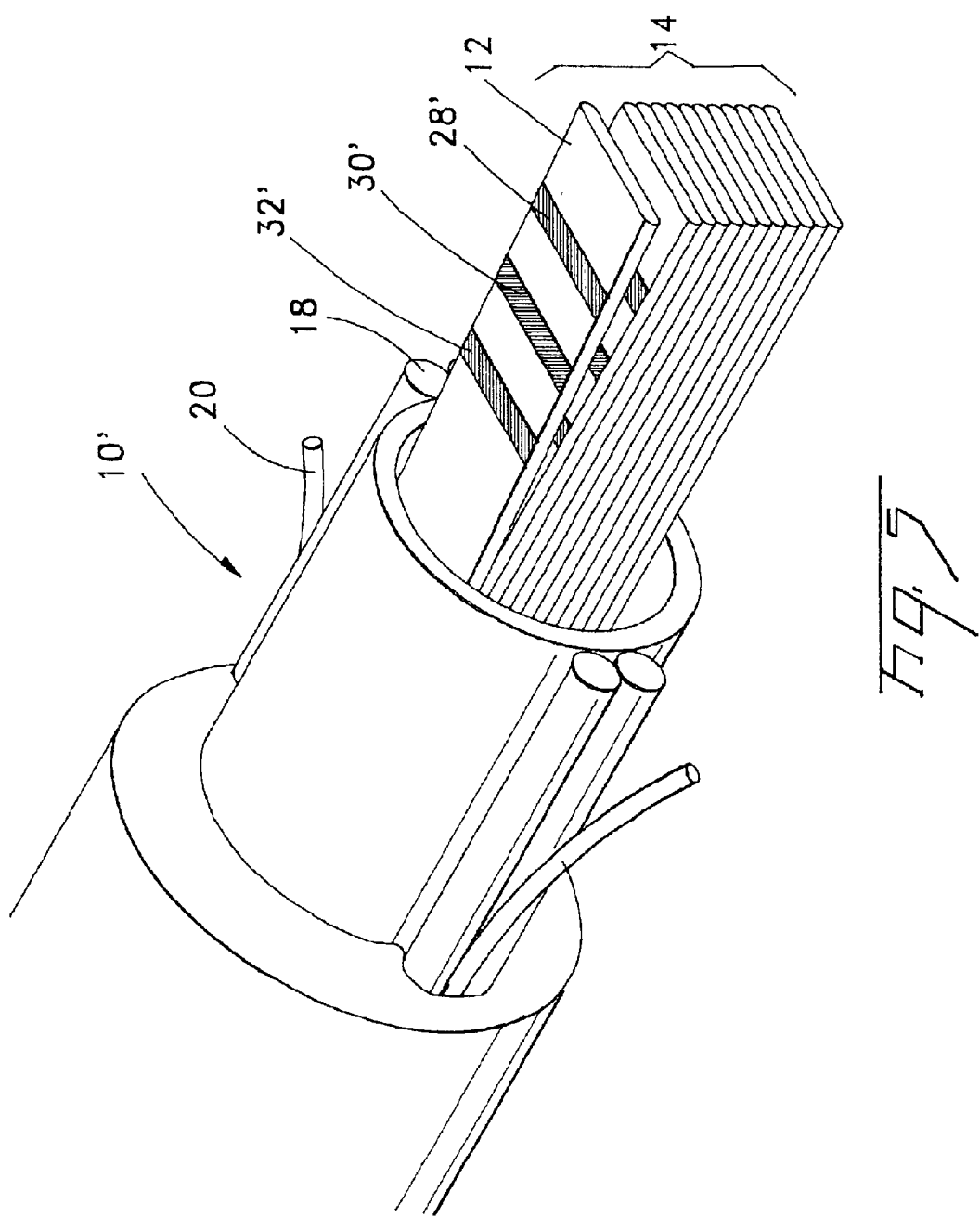
FIG. 5 is a perspective view of a fiber optic cable in accordance with another embodiment of the present invention.

The present invention is applicable to various types of fiber optic cables, including single-tube cables having a single optical ribbon stack such as the cables 10, 10' illustrated in FIGS. 1 and 5, single-tube cables having multiple optical ribbon stacks (not shown), and multi-tube cables (not shown) having more than one buffer tube each containing an optical ribbon stack. The present invention can also be applied to cables having optical ribbon stacks contained in other than buffer tubes, such as in channels defined in a solid-core cable (e.g., a so-called star-core cable or the like). Moreover, there is no requirement that the optical ribbons in the cable be in the form of an optical ribbon stack (i.e., multiple optical ribbons could be unbound to each other), although the present invention generally is most useful where there is a substantial number of optical ribbons, in which case the optical ribbons typically will be in the form of one or more stacks. At any rate, the particular structure of the cable is not critical to the present invention.

Many modifications and other embodiments of the present invention will come to mind to one skilled in the art to which this invention pertains having the benefit of the teachings presented in the foregoing descriptions and the associated drawings. Therefore, it is to be understood that the present invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber optic cable, comprising:

a tube defining an interior passage therein;

an optical ribbon disposed in the interior passage of the tube, the optical ribbon comprising a plurality of generally parallel optical fibers arranged in a generally planar array and bound together by a covering of a matrix material surrounding said generally planar array, the optical ribbon having at least a first colored region, a second colored region, and another colored region, wherein the first and second colored regions respectively denote first and second characters of at least a two-character identifier for the optical ribbon serving to indicate an optical ribbon number and the another colored region denotes the type of optical fibers contained in the optical ribbon.

2. The fiber optic cable of claim 1, wherein the at least two-character identifier for the optical ribbon comprises at least first, second, third, and fourth colored regions of different colors, the first, second, and third colored regions serving to distinguish the optical ribbon from other optical ribbons and the fourth colored region denoting the type of the optical fibers contained in the optical ribbon.

3. The fiber optic cable of claim 2, wherein the first, second, and third colored regions respectively denote first, second, and third characters of a three-character identifier for the optical ribbon.

4. The fiber optic cable of claim 1, wherein the colored regions comprise stripes arranged in a predetermined orientation with respect to the optical ribbon.

5. The fiber optical cable of claim 4, wherein the stripes extend continuously lengthwise along the optical ribbon.

6. The fiber optic cable of claim 1, wherein the colored regions comprise integrally formed parts of the covering of the optical ribbon.

7. The fiber optic cable of claim 1, wherein the colored regions extend transversely along the optical ribbon and are repeated at periodic intervals along the optical ribbon.

8. The fiber optic cable of claim 1, wherein the colored regions are provided on the optical ribbon in a predetermined arrangement that is repeated at periodic intervals along the optical ribbon.

9. The fiber optic cable of claim 1, the another colored region serving to indicate whether the optical fibers of the optical ribbon are single-mode or multi-mode optical fibers.

10. An optical ribbon, comprising:

a plurality of optical fibers arranged generally parallel to one another in a generally planar array; and a covering of a matrix material surrounding said generally planar array so as to cover and bind together the optical fibers, wherein the optical ribbon has an identifier visible at an outer surface of the matrix material, the identifier comprising at least two colored regions of different colors conveying identifying information about the optical ribbon, wherein at least one of the colored regions has a color selected to denote an identifying number pre-assigned to the optical ribbon and another of the colored regions has a color selected to indicate a type of the optical fibers contained in the optical ribbon.

11. The optical ribbon of claim 10, wherein the colored regions comprise at least first, second, and third colored regions, the first and second colored regions respectively denoting first and second digits of the pre-assigned identifying number of the optical ribbon and the third colored region denoting the type of the optical fibers contained in the optical ribbon.

12. The optical ribbon of claim 10, wherein the colored regions comprise stripes arranged in a predetermined orientation with respect to the optical ribbon.

13. The optical ribbon of claim 10, wherein the colored regions extend continuously lengthwise along the optical ribbon.

14. The optical ribbon of claim 10, wherein the colored regions comprise integrally formed parts of the covering.

15. The optical ribbon of claim 10, wherein the colored regions are discontinuous in a lengthwise direction along the optical ribbon.

16. The optical ribbon of claim 10, wherein the colored regions are provided on the optical ribbon in a predetermined arrangement that is repeated at periodic intervals along the optical ribbon.

17. A method for making a fiber optic cable, comprising;
assigning a unique identifier having at least one character to each of a plurality of optical ribbons, each optical ribbon comprising a plurality of generally parallel optical fibers arranged in a generally planar array and bound together by a covering of matrix material surrounding said generally planar array, the optical fibers of each optical ribbon being of a predetermined type;
providing at least two colored regions of different colors visible on an outer surface of the matrix material of each optical ribbon, at least one of the colored regions having a color selected to denote said at least one character of the identifier for the optical ribbon and another of the colored regions having a color selected to denote the type of optical fibers in the optical ribbon; and
disposing the optical ribbons in at least one passage of a cable component.

18. The method claim 17, wherein each optical ribbon is assigned a two-digit identifying number, and each optical ribbon has at least two colored regions of different colors respectively denoting the two digits of the identifying number.

19. The method of claim 18, wherein each digit comprises one of ten different integers from zero to nine, nine of said integers being respectively denoted by nine different colors and the tenth integer being denoted by absence of any color.

20. The method of claim 18, wherein each digit comprises one of ten different integers from zero to nine, said integers being respectively denoted by ten different colors.

21. The method of claim 17, wherein the optical fibers in each optical ribbon can be of at least two different types, and at least two different colors are used for denoting said at least two different types.

22. The method of claim 21, wherein an additional type of optical fibers is denoted by absence of any color.

23. The method of claim 17, wherein the covering of matrix material of each optical ribbon is extruded over the optical fibers through an extrusion die and the colored regions are formed by supplying colored material along with the matrix material into the extrusion die, much that the colored regions comprise integrally formed parts of the covering.

24. A method for making an optical ribbon, comprising:
arranging a plurality of optical fibers generally parallel to one another in a generally planar array;
extruding a covering of matrix material over the generally planar array of optical fibers to cover and bind the fibers together; and
applying a series of colored regions to one side of the covering, the colored regions being in a predetermined arrangement visible at an outer surface of the covering, for conveying identifying information about a predetermined location of the optical ribbon in an optical ribbon stack and the type of optical fibers in the ribbon.

25. The method of claim 24, wherein the step of applying the colored regions is performed simultaneously with the step of extruding the covering.

26. The method of claim 25, wherein the covering of matrix material is extruded over the optical fibers through an extrusion die and the colored regions are applied by supplying colored material along with the matrix material into the extrusion die, such that the colored regions are formed integrally with the covering.

27. The method of claim 24, wherein the step of applying the colored regions is performed after completion of the step of extruding the covering.

28. The method of claim 27, further comprising the step of curing the matrix material after the extruding step, and wherein the step of applying the colored regions is performed prior to the step of curing the matrix material.

29. An optical ribbon, comprising:
a plurality of optical fibers arranged generally parallel to one another in a generally planar array, the optical fibers being arranged into at least two fiber sub-units, each of the at least two sub-units having at least one optical fiber and a primary matrix; and
an outer matrix covering that encapsulates and binds together the fiber sub-units, the outer matrix covering comprising separate regions of a first matrix material adhered respectively to each of the fiber sub-units and a connecting region of a second matrix material joining adjacent fiber sub-units together, the first matrix material adhering to the fiber sub-units with a greater tenacity than does the second matrix material such that the outer matrix covering preferentially splits at the connecting region between fiber sub-units whereby the separate regions of the first matrix material tend to remain adhered to the fiber sub-units upon separation thereof.

30. The optical ribbon of claim 29, further comprising identifying markings visible at outer surfaces of the separate regions of the first matrix material.

31. The optical ribbon of claim 29, wherein the first matrix material has a higher modulus of elasticity than the second matrix material.

32. An optical ribbon, comprising:
a plurality of optical fibers arranged generally parallel to one another in a generally planar array, the optical fibers including at least one adjacent pair of optical fibers bound together by a connecting matrix material, the connecting matrix material being of a predetermined color for identifying said pair of optical fibers and covering less than all of the adjacent pair of optical fibers; and an outer matrix covering that encapsulates and binds together all of the optical fibers, the outer matrix covering being sufficiently transparent that the color of the connecting matrix material is visible through the outer matrix covering.

33. The optical ribbon of claim 32, wherein there are a plurality of adjacent pairs of the optical fibers, each adjacent pair of optical fibers being bound together by connecting matrix material of a predetermined color for identifying said pair.

34. An optical ribbon, comprising:

a plurality of optical fibers arranged generally parallel to one another in a generally planar array; and a matrix covering that encapsulates and binds together the optical fibers, the matrix covering comprising a plurality of different colored regions formed of a first matrix material and bound respectively to the plurality of optical fibers for identifying the optical fibers, the matrix covering further comprising a second matrix material that intercedes between and maintains the colored regions substantially separate from one another, the first matrix material adhering to the optical fibers with a greater tenacity than the second matrix material, whereby the colored regions tend to remain adhered to the optical fibers and each colored region is bound to less than all of the outer surface of the respective optical fibers.

35. The optical ribbon of claim 34, wherein the colored regions extend to and form part of an outer surface of the matrix covering.

36. The optical ribbon of claim 34, wherein the first matrix material has a higher modulus of elasticity than the second matrix material.

* * * * *